United States Patent [19]

Jones et al.

[11] Patent Number: 4,812,943

[45] Date of Patent: Mar. 14, 1989

[54] CURRENT FAULT PROTECTION SYSTEM

[75] Inventors: Gregory D. Jones; William R. Owens, both of Rockford; Clifford G. Thiel, Stillman Valley; Clive M. Danby, Rockford, all of Ill.

[73] Assignee: Sundstrand Corp., Rockford, Ill.

[21] Appl. No.: 137,583

[22] Filed: Dec. 24, 1987

[51] Int. Cl.$^4$ .............................. H02H 3/08
[52] U.S. Cl. ........................ 361/92; 361/95
[58] Field of Search ..................... 361/87, 93, 95; 340/664

[56] References Cited

U.S. PATENT DOCUMENTS

| | | | |
|---|---|---|---|
| 3,337,742 | 8/1967 | Baehr et al. | 307/64 |
| 3,505,598 | 8/1967 | Merrill | 324/77 |
| 4,075,502 | 2/1978 | Walley, Jr. | 307/64 |
| 4,087,697 | 5/1978 | Johnson | 307/66 |
| 4,096,395 | 6/1978 | Bogel et al. | 307/64 |
| 4,156,280 | 5/1979 | Griess | 364/481 |
| 4,219,858 | 8/1980 | DePuy, et al. | 361/93 |
| 4,219,860 | 8/1980 | DePuy | 361/94 |
| 4,231,029 | 10/1980 | Johnston | 340/658 |
| 4,356,553 | 10/1982 | Steinle et al. | 364/483 |
| 4,384,213 | 5/1983 | Bogel | 307/64 |
| 4,405,867 | 9/1983 | Moakler et al. | 307/64 |
| 4,423,458 | 12/1983 | Stich | 361/93 |
| 4,446,498 | 5/1984 | Stich | 361/87 |
| 4,475,047 | 10/1984 | Ebert, Jr. | 307/66 |
| 4,520,275 | 5/1985 | Marusik | 307/64 |
| 4,535,409 | 8/1985 | Jindrick et al. | 364/481 |
| 4,583,004 | 4/1986 | Yearsin | 307/64 |
| 4,605,982 | 8/1986 | Harner et al. | 361/94 |
| 4,625,283 | 11/1986 | Hurley | 364/487 |
| 4,628,397 | 12/1986 | Gareis et al. | 361/98 |
| 4,697,219 | 9/1987 | Mitsuoka | 361/93 |
| 4,703,389 | 10/1987 | Scott | 361/93 |
| 4,763,220 | 8/1988 | Balber et al. | 361/93 |

Primary Examiner—A. D. Pellinen
Assistant Examiner—Derek S. Jennings
Attorney, Agent, or Firm—Antonelli, Terry & Wands

[57] ABSTRACT

An overcurrent protection system (10) for a power supply is disclosed. The system monitors the instantaneous flow of current between a power supply (12) and an electrical load (16) to detect when the flow of current exceeds a maximum rated amount. A counter (30) is used for counting the number of times that samples of the flow of current exceed the maximum rated amount synchronous with zero current crossing to generate a trip signal when a predetermined count is reached which disconnects the power supply (12) from the load. The counter (30) is decremented each time a predetermined time interval elapses in which the flow of current above the maximum rate is not detected as measured from a point of zero current flow between the power supply (12) and the electrical load (14). The invention may be used for both AC and DC power supplies.

18 Claims, 5 Drawing Sheets

CURRENT FAULT PROTECTION SYSTEM

CROSS REFERENCE TO RELATED APPLICATIONS

Reference is made to the following applications which contain subject matter related to the present invention and which are incorporated herein by reference in their entirety:

1. I²t Trip Generator, U.S. patent application Ser. No. 78,366, filed on July 27, 1987.
2. Voltage Fault Detector, U.S. patent application Ser. No. 137,735, filed on even date herewith.
3. Phase Controller For Processing Current and Voltage Faults, U.S. patent application Ser. No. 137,575, filed on even date herewith.
4. Power Controller, U.S. patent application Ser. No. 137,582, filed on even date herewith.

TECHNICAL FIELD

The present invention relates to load fault protection systems.

BACKGROUND ART

Conventional circuit breakers are based upon the principal that a power source is disconnected from a load when a load fault is detected. Circuit breakers disconnect the power source from the load when current flow greater than a rated current is sensed.

U.S. Pat. Nos. 4,384,213, 4,423,458, 4,520,275, 4,583,004, 4,605,982 and 4,628,397 disclose circuits for monitoring the amount of current flowing from a power source to a load.

DISCLOSURE OF INVENTION

The present invention provides a protection system for power supplies for preventing the drawing of an excessive amount of current by an electrical load fault which could damage the power supply and/or switching elements in the circuits for disconnecting the power supply when a fault is detected. When applied to AC power supplies, the present invention permits a rapid determination to be made if an actual load fault exists requiring the disconnection of the power supply from the load as contrasted with a transient condition during which an amount of current over a maximum rated current is being drawn. In its preferred form, the present invention will be used as a current monitoring circuit in a power supply for airframes which require uninterrupted power to be provided by a backup power supply which is to be switched into use upon failure of any of the phases of the primary power supply. The present invention monitors the instantaneous amount of current flowing between the power supply through a series circuit to the electrical load to determine the first indication when a potential load fault exists by detecting a current flow greater than a maximum rated current. As soon as the first indication occurs, a shunt circuit is switched between the power supply and the electrical load which contains an impedance limiting the amount of current which may flow to the load. At the time of switching in the shunt circuit, a counter is activated to count a predetermined number of instances when the maximum amount of current is exceeded over one or more cycles to generate a trip signal disconnecting the series circuit and the shunt circuit. The count of the counter is augmented each time current flow exceeding the maximum current flow is detected. The count is decremented each time the current flow does not exceed the maximum current flow within a predetermined interval after the detection of a zero current flow. Accordingly, the trip signal is only generated upon the occurrence of non-transient conditions indicating a real load fault. While the invention is preferably utilized with AC power supplies, it should be understood that in its broadest sense it is also useful for DC power supplies.

A protection circuit for a power supply for preventing the drawing of an excessive amount of current by an electrical load fault in accordance with the invention includes a circuit for sensing the magnitude of current flowing to the electrical load and producing a first control signal having a first level when current flow is less than a maximum amount and having a second level when current flow exceeds the maximum amount, and a second control signal having a first level which occurs in response to detection of current flow greater in magnitude than the maximum amount of current flow and a second level when a load fault is not present; a switching circuit disposed in series with the load and the power supply, conduction of the switching circuit being controlled by the first control signal and passing current when the first control signal is at the first level; and a shunt circuit, coupled in parallel with the switching circuit, the shunt circuit containing a second switching circuit coupled to an impedance which limits the amount of current drawn by the load when the impedance is in series with the power supply and the load, conduction of the second switching circuit being controlled by the second control signal and passing current to per it current flow through the impedance of the shunt circuit when the second control signal has the first level and blocking current flow when the second control signal has the second level. The circuit for sensing the magnitude of current flowing to the electrical load and producing a first control signal includes a detection circuit for detecting when the flow of current between the power supply and the load is zero, the first level of the first control signal being produced in response to the detection of the flow of current between the power supply and the load being zero after the second level of the first signal has been produced. A counter is provided which is responsive to each occurrence of the second level of the first signal for counting the number of occurrences of the second level of the first signal and producing a trip signal when a predetermined count of the number of occurrences of the second level of the first signal is reached. The trip signal activates a disconnection circuit for disconnecting the power supply from the load. In the preferred embodiment, the disconnection circuit is implemented by switches contained in the switching circuit and the shunt circuit. A timer is provided which is responsive to the circuit for detecting when the current flow is zero for producing a count decrementing signal each time a predetermined time elapses between the last occurrence of a zero current flow and the detection of current flow greater than the maximum current flow with the count decrement signal causing the count of the counter to be decremented. In a preferred embodiment, the preferred time is equal to 90° of a cycle of the frequency of AC power being provided by the power supply. The predetermined count may be set at any non-zero number but, in one embodiment of the invention, it has been set to 4 to prevent the disconnection of the power source from the load as a consequence of short duration transient conditions in which an amount of current greater than the rated amount of current is being drawn.

The circuit for sensing the magnitude of current flowing to the electrical load and producing a first control signal includes a first latch, responsive to the sensed current and the detection circuit for detecting when current flow is zero, having a set state which is set by a sensed current flow greater than the maximum current flow, the first latch producing the second level of the first signal in response to the sensing of current flow greater than the maximum current flow and having a reset state which is reset in response to the sensed current flow being zero; a second latch, responsive to the sensed current flow and the counter, having a set state which is set by a sensed current flow greater than the maximum current flow, the second latch producing the first level of the second signal in response to the sensing of current flow greater than the maximum current flow and having a reset state which is reset in response to the counter counting the predetermined count to produce the second level of the second signal. The circuit for sensing the magnitude of current flowing to the electrical load and producing a first control signal further includes an AND gate having an input from the detection circuit for detecting when current flow of zero signalling the flow of zero current and an input which is the second control signal and an output to the timer; a NAND gate having an input from the timer signalling the elapsing of the predetermined time, an input which is the first control signal and an input which is the second control signal, and an output which is the decrement signal; and a NAND gate having an input from the first control signal and an input from the second control signal and an output which is the augment signal.

In one embodiment of the present invention, the second switching circuit includes a first silicon controlled rectifier and a second silicon controlled rectifier in antiparallel with the first silicon controlled rectifier the second control signal being applied to the gates of the silicon controlled rectifiers; and the impedance being in series with the antiparallel combination of the silicon controlled rectifiers.

In an embodiment of the invention, the first switching circuit includes a first series circuit comprised of a pair of switches which are conductive for positive or negative voltage swings of an AC signal flowing between a pair of terminals between which current flows when the first level of the first control signal is applied to a control terminal, one of the pair of terminals of one of the switches being coupled to the power supply, one of the pair of terminals of the other of the switches being coupled to the load, the other of the terminals of the pair of switches being coupled to each other, a second series circuit comprised of a pair of oppositely poled diodes, one of the diodes having a cathode coupled to the power supply and an anode coupled to the other of the terminals of the switches which are coupled together, the other of the diodes having a cathode coupled to the load and an anode coupled to the other of the switches which are coupled together and to the anode of the other diode. Furthermore, the first switching circuit includes a resistance coupled between the other of the pair of terminals of the switches, the magnitude of current flow being sensed by a voltage drop across the resistance.

BEST MODE FOR CARRYING OUT THE INVENTION

Figure 1:
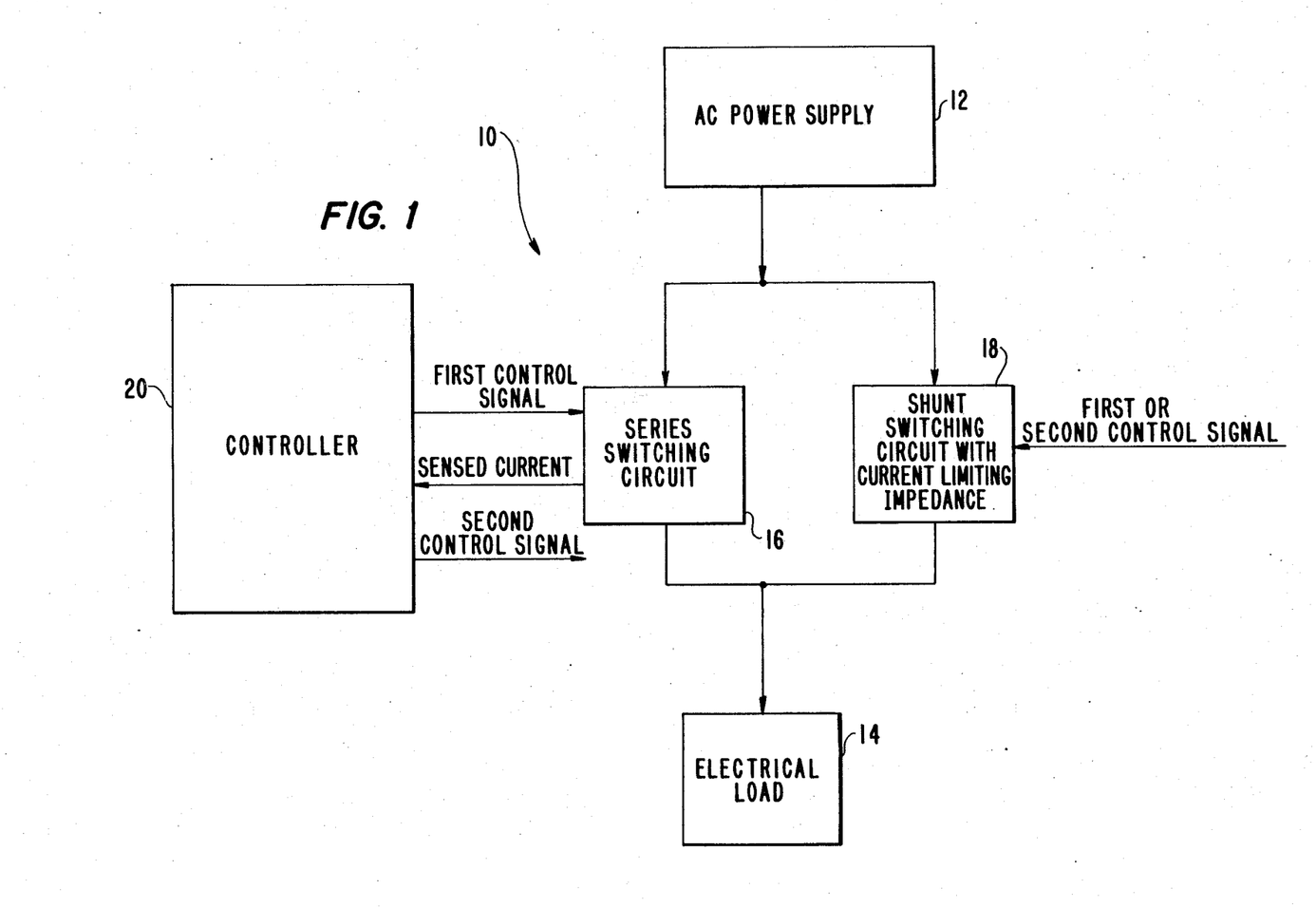
FIG. 1 is a block diagram of the present invention.

FIG. 1 illustrates a block diagram of the present invention (10). The present invention provides protection for a power supply 12 which in the preferred embodiment of the present invention is either a single phase power supply or is a single phase of a multiple phase power supply such as a 400 Hz power supply used in airframes. During normal operation of the AC power supply 12, current flows between the power supply 12 and the electrical load 14 through a series switching circuit 16. The series switching circuit 16 contains one or more pairs of switches which are bidirectionally conductive to permit the uninterrupted flow of AC current between the AC power supply 12 and the electrical load 14. A shunt switching circuit with current limiting impedance 18 is connected in parallel with the series switching circuit 16. During normal operation of the AC power supply 12 when current flow is below a maximum amount, such as 300% of the normal rated current flow, the shunt switching circuit 18 is not conductive. It should be understood that the invention is not limited to any particular maximum amount. However, when a current sensing circuit contained in controller 20 senses that the flow of current between the AC power supply 12 and the electrical load 14 is above the maximum rated current flow, a second level of a first control signal is generated which open circuits the series switching circuit 16 to interrupt the flow of current therethrough and a first level of a second control signal is generated which is applied to the shunt switching circuit 18 to close the shunt switching circuit to cause current to flow through the shunt switching circuit between the AC power supply 12 and the electrical load 14. The first control signal switches from the second level to the first level after the detection of zero current flow between the AC power supply and the electrical load as described below. Preferably, switching circuit 18 should close before switch 16 opens to avoid non-conductive breaks. The current limiting impedance contained in series with a switching element located within the shunt switching circuit 18 limits the amount of current which can flow between the AC power supply 12 and the electrical load 14 to an amount which will not damage the power supply or switching devices. Once current flow greater than the maximum is detected, the controller generates the first level of the second control signal to cause the shunt switching circuit 18 to remain closed until a current fault is detected or until a counter contained within the controller 20, which is augmented each time sampled current above the maximum rated amount is detected, counts down to zero in response to a decrement signal. The decrement signal decreases the count of the counter by 1 each time the flow of current between the AC power supply 12 and electrical load 14 is determined to not exceed the maximum within a predetermined time after the detection of zero current flow between the AC power supply and the electrical load. The detection of a load fault occurs when the counter counts up to a predetermined programmable number, such as 4, at which time the series switching circuit 16 and shunt switching circuit 18 are open circuited by maintaining the first control signal at the second level and changing the second control signal from the second level to the first level to disconnect the AC power supply 12 from the electrical load 14 to prevent damage to the power supply switches. The instantaneous disconnection of the switching elements in the series switching circuit 16 in response to the second level of the first control signal prevents their possible damage or destruction. Moreover, switching the shunt switching circuit in series with the power supply 12 and the electrical load 14 in response to first level of the second control signal limits the current drawn during determination if one or more current samples exceeding the maximum constitute a load fault which prevents possible damage or destruction of the power supply.

Figure 2:
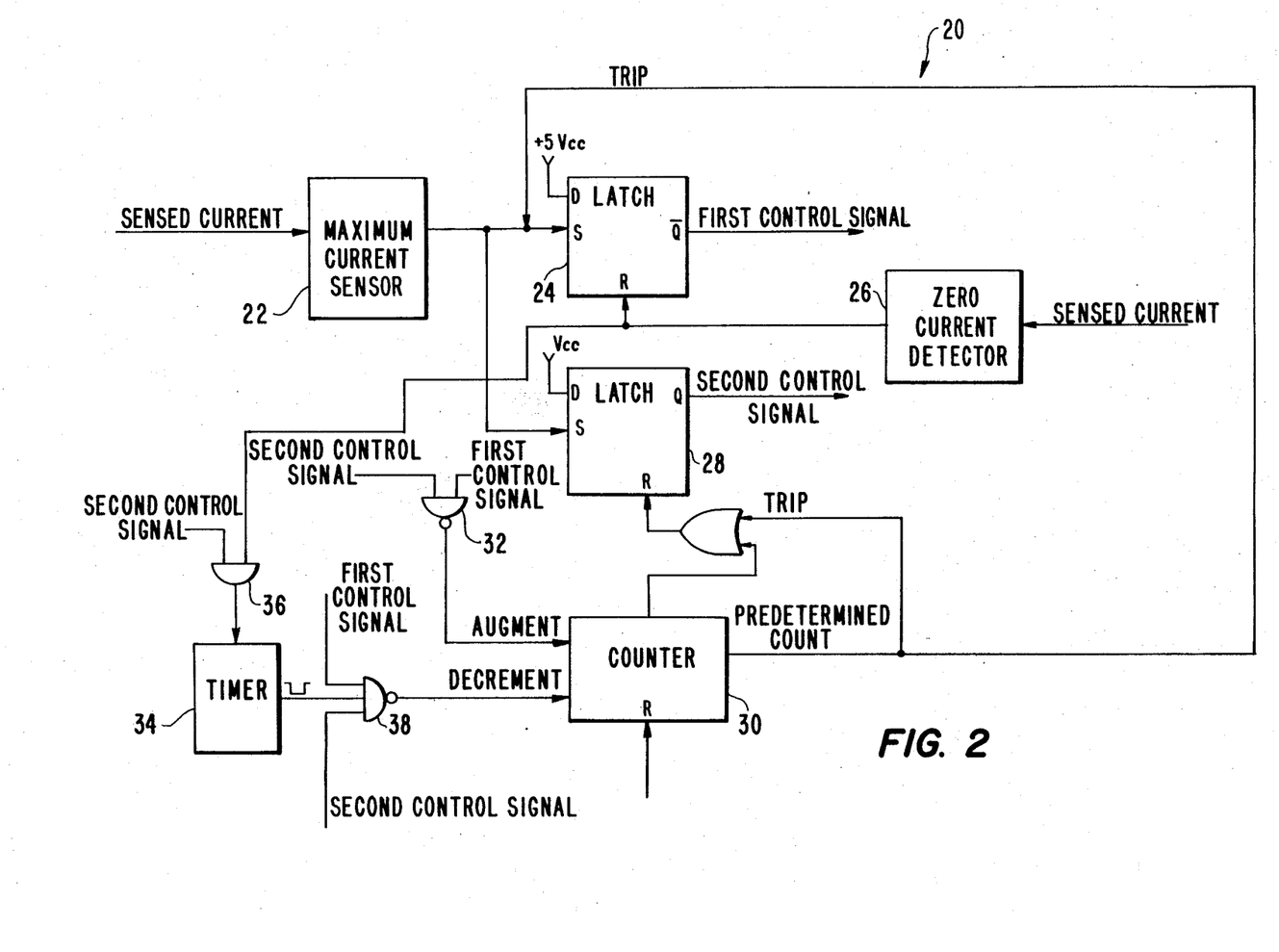
FIG. 2, is a block diagram of the controller of FIG. 1.

FIG. 2 illustrates a block diagram of an embodiment of the controller 20 of FIG. 1. The sensed current from the series switching circuit 16 is processed by a maximum current sensor 22 which detects when either the positive going or negative going peaks of the AC waveform exceed a predetermined maximum such as 300% of the normal rated current capacity of the AC power supply 12. The maximum current sensor 22 may be implemented by a pair of comparators and is described below with reference to FIG. 3. A high level output signal is produced in response to the absolute value of the AC signal current exceeding the maximum. The first control signal is produced by a latch 24 which may be a conventional D flip-flop. Each time a high level output signal is produced by the maximum current sensor 22, the output state of the latch 24 is set to produce a low level output which is the second level of the first control signal. Accordingly, the first control signal has a first level which is high when normal current flow exists between the AC power supply 12 and the electrical load 14 and a second level which is low when current flow above the maximum is detected by the maximum current sensor 22. The latch 24 is reset each time the current flow between the AC power supply 12 and the electrical load 14 is detected to be zero by a zero current detector 26 which causes the series switching circuit 16 to be connected back in series with the electrical load 14 which effectively bypasses the shunt switching circuit 18. Subsequent overcurrent conditions cause the series switching circuit 16 to again be disconnected. The zero current detector is responsive to the sensed cur rent outputted from the series switching circuit 16. An embodiment of the zero current detector 26 is described below with reference to FIG. 4 and may be implemented by a pair of comparators. The second control signal is produced by a latch 28 which produces a high level output signal corresponding to the first level of the second control signal in response to a high level output from the maximum current sensor 22. The latch 28 is reset to produce the second level of the second control signal in response to an output from counter 30 having a count of zero and in response to the generation of a trip signal by the counter which occurs when a predetermined count of current samples exceeding the maximum current is accumulated in the counter indicative of a load fault with each occurrence of the second level of the first control signal representing a sample greater than the maximum. As stated above, the predetermined count may be 4. Counter 30 augments its count in response to each occurrence of the second (low) level of the first control signal. NAND gate 32 insures that a high level augment signal is produced when the first control signal changes to the second level and the second control signal is at the first level and is a low level when both the first and second control signals are at a high level. The counter 30 is decremented by a decrement signal produced each time the maximum current sensor 22 does not produce a detection of current flow above the maximum level within a predetermined time after the detection of a zero current flow by the zero current detector 26. Timer 34 is set to produce an output pulse after the application of a high pulse by the zero current detector 26 is passed by AND gate 36 when 90° of the frequency of the AC power supply 12 has occurred without the detection of a maximum current condition. NAND gate 38 permits output pulses from the timer to be produced each time the predetermined time elapses after the zero current detector 26 produces a high level output signal when the first and second control signals are not at the same level which occurs in response to the detection of a maximum current being sensed. It is seen that the counter maintains a running count which is augmented and decremented and generates the trip signal, which is the second level of the second control signal, indicative of a load fault upon the counting of the predetermined count of current samples exceeding the maximum as signalled by the second level of the first control signal produced by latch 24. The function of the decrementing input is to prevent the power supply from tripping (being disconnected) in response to a transient condition which is not truly reflective of a load fault. The predetermined count may be set at any number with the larger the number the longer the response time of an overcurrent condition for generating the trip signal.

Figure 3:
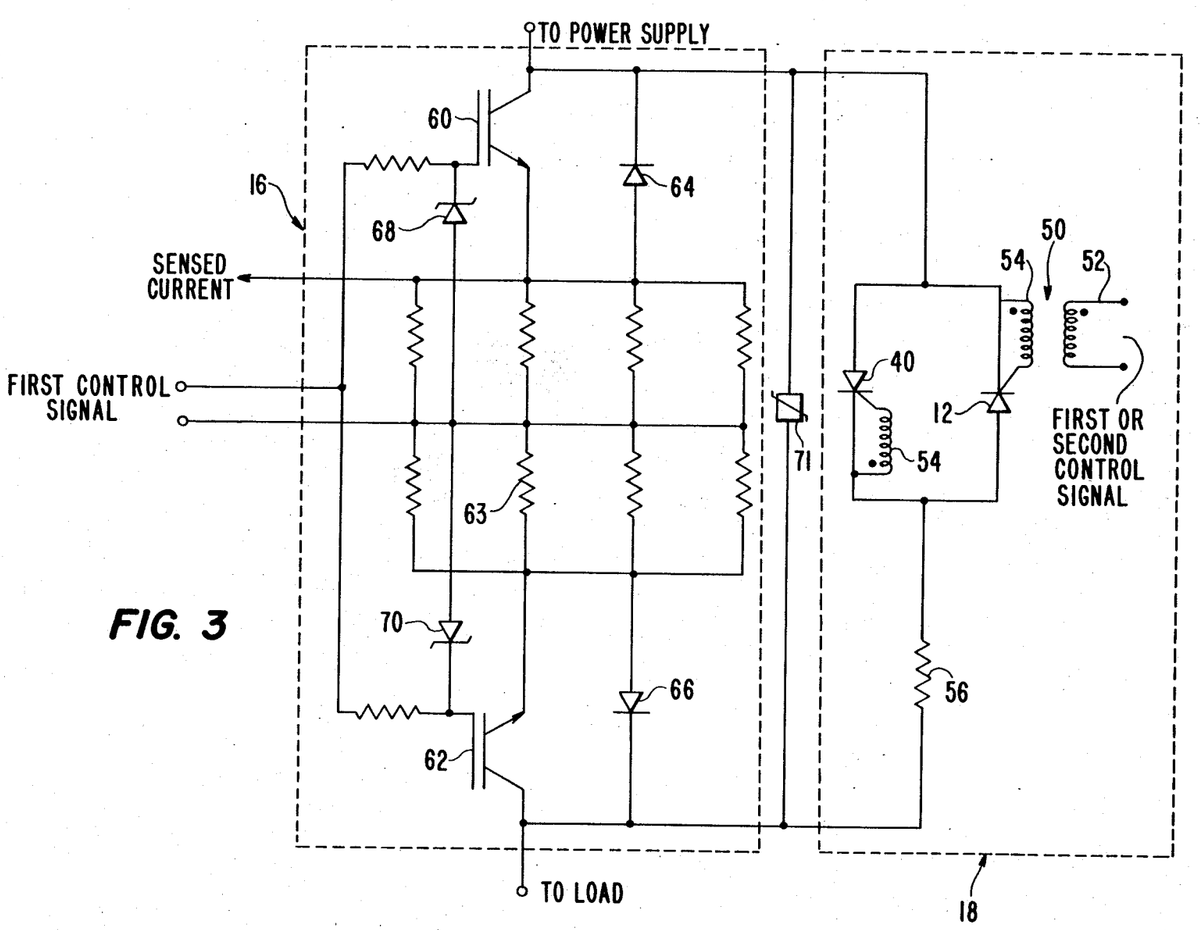
FIG. 3 is a schematic of the series switching circuit and shunt switching circuit with current limiting impedance of FIG. 1.

FIG. 3 illustrates an embodiment of the series switching circuit 16 and shunt switching circuit 18. Like reference numerals are used in FIGS. 1 and 3. The shunt switching circuit 18 is comprised of a pair of silicon controlled rectifiers which are connected in antiparallel with each other. Transformer 50 has its primary, preferably connected to the second control signal, although in an alternative embodiment described below, the first control signal may be used. The secondaries 54 of the transformer 50 produce a signal for forward biasing the SCRs 40 and 42. In this embodiment, the presence of the first level of the second control signal is used to connect an AC source to the primary of transformer 50 to maintain activation of the SCRs to permit current to flow as long as the second control signal has the first level. Resistance 56 is coupled in series with the antiparallel combination of the SCRs 40 and 42 to provide sufficient resistance to limit the maximum flow of current between the AC power supply 12 and the electrical load 14 during the determination of whether or not an actual load fault exists by the operation of the counter 30. The magnitude of the resistance 56 is determined by the rating of the power supply. The series switching circuit 16 includes a pair of insulated gate transistors 60 and 62 which are forward biased by the high level state of the first control signal. The first and second insulated gate transistors 60 and 62 permit current to flow either from the power supply 12 to the electrical load 14 or from the electrical load 14 to the power supply 12 as occur during the positive and negative going cycles of AC power. A plurality of resistances 63 are coupled between the emitters of the insulated gate transistors 60 and 62 to permit the generation of a voltage proportional to the flow of current between the AC power supply 12 and the electrical load 14. It should be understood that while eight discrete resistances 63 are illustrated, other combinations of one or more resistances may be used. The first and second insulated gate transistors 60 and 62 form a first series circuit between their emitter terminals. A pair of oppositely poled diodes 64 and 66 having their anodes coupled together through the resistances 63 and their cathodes coupled to the collectors of the insulated gate transistors 60 and 62, respectively, provide a second path for current flow as explained below. When current is flowing from the AC power supply 12 to the electrical load 14, current flows through the collector and emitter of transistor 60 through the resistances 63 and through diode 66 to load 14. When current is flowing from the electrical load 14 to the AC power supply 12, current flows through the collector and emitter of transistor 62 through resistances 63, through diode 64 to power supply 12. Zener diodes 68 and 70 are provided for voltage protection of the bases of the insulated gate transistors 60 and 62. The first control signal is applied to the gates of insulated gate transistors 60 and 62. A metal oxide varistor 71 provides protection for the insulated gate transistors 60 and 62 against voltage surges.

Figure 4:
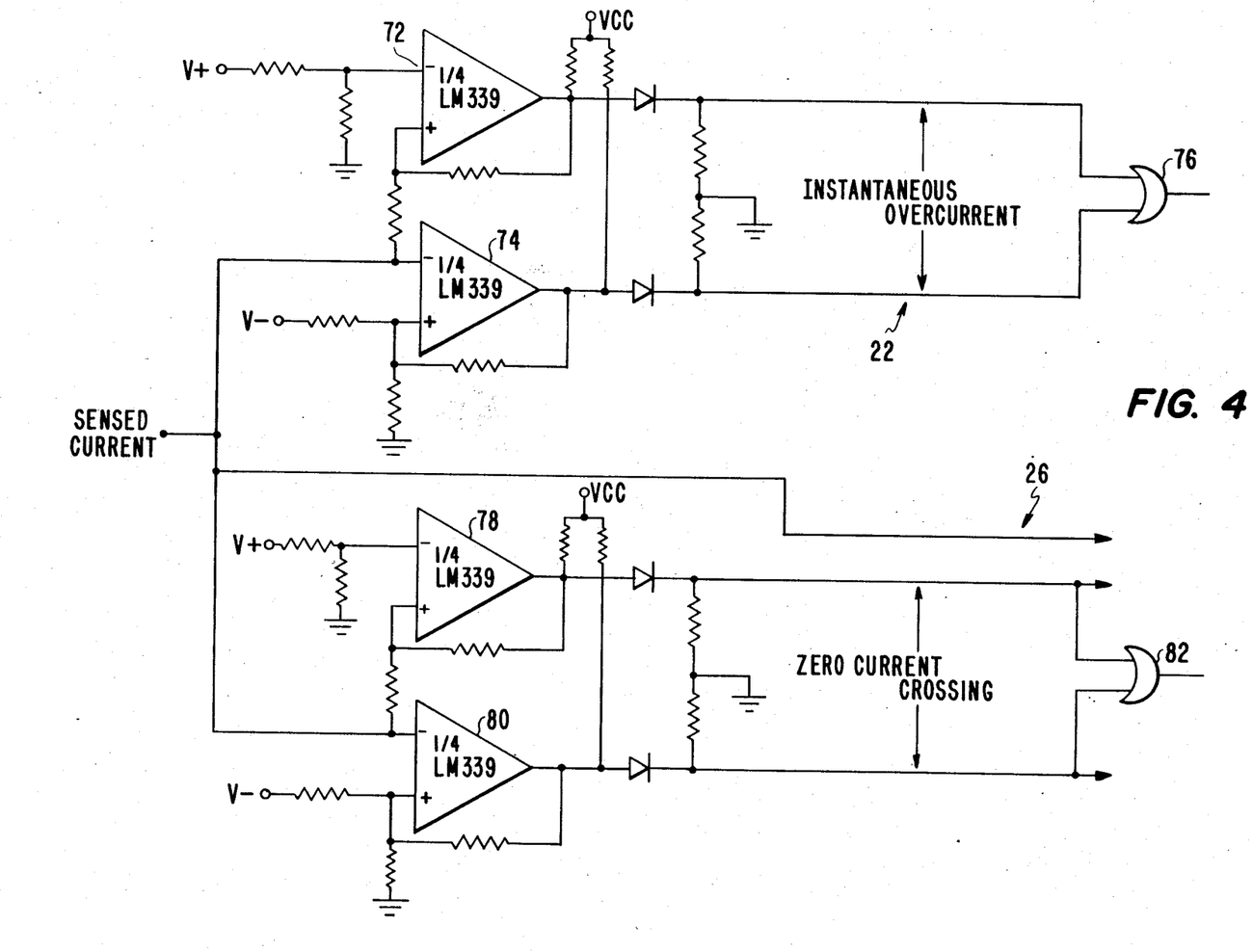
FIG. 4 is a schematic of an embodiment of the zero current crossing and instantaneous maximum current detection circuits of the controller of FIG. 1

FIG. 4 illustrates a circuit schematic of an embodiment of the maximum current sensor 22 and the zero current detector 26. The maximum current sensor 22 includes a pair of comparators 72 and 74 which respectively detect if the positive going portion of the AC power signal exceeds the maximum rated current flow and if the negative going portion of the AC power exceeds the maximum current flow. The outputs from the comparators 72 and 74 are applied to the inputs of OR gate 76 which produces a high level output signal upon the detection of either current flow exceeding the maximum rated current to or from the AC power supply 12. The zero current detector 26 has a pair of comparators 78 and 80 which respectively compare the sensed current with a zero reference potential to produce an output signal each time current flow to or from the AC power supply 12 to the electrical load 14 or from the electrical load to the AC power supply crosses through zero. The outputs from the comparators 78 and 80 are inputted to OR gate 82 which produces a high level output signal each time a zero crossing point is detected.

Figure 5:
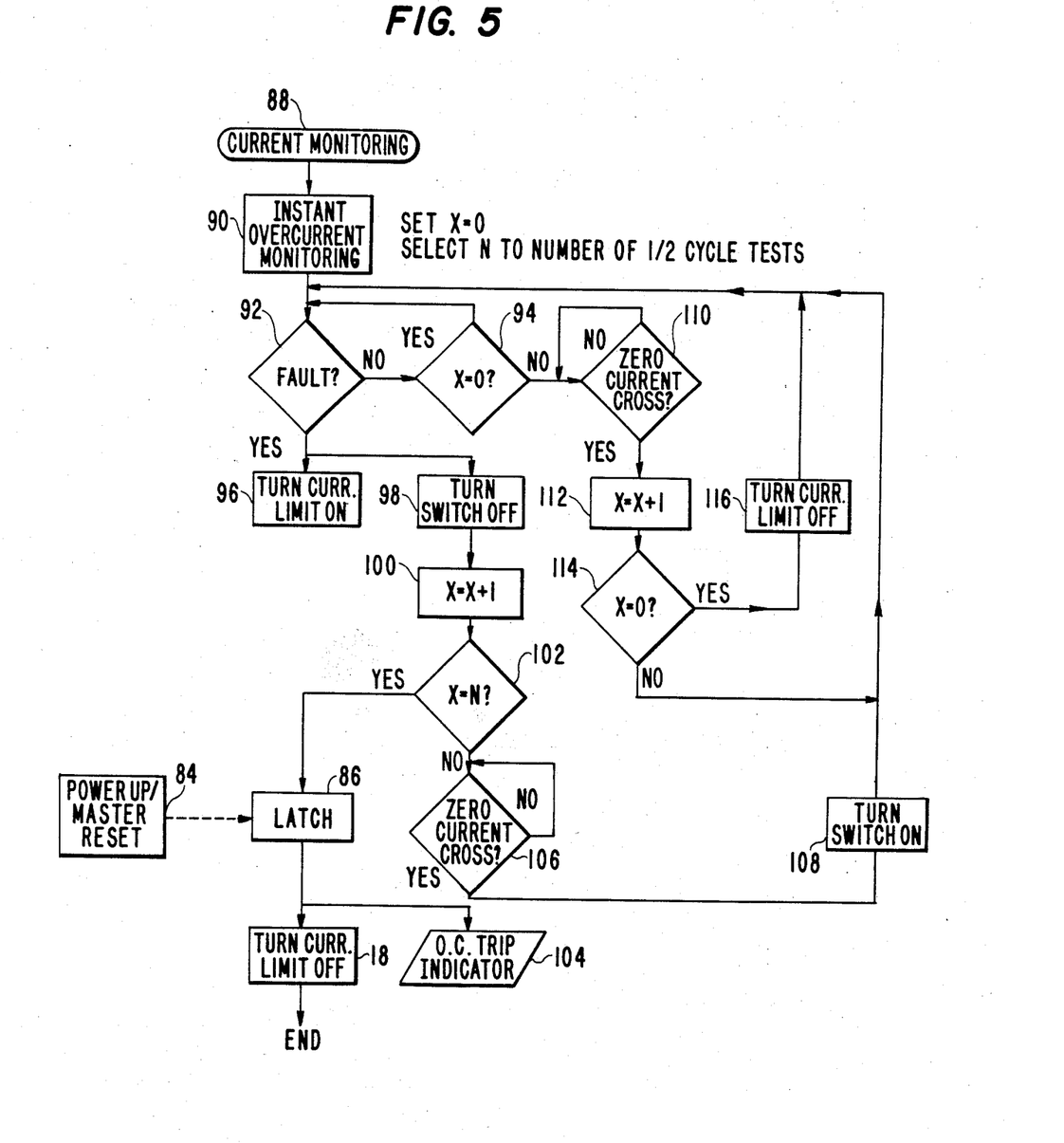
FIG. 5 is a block diagram of the operation of the present invention.

FIG. 5 illustrates a flowchart of the operation of the present invention. It should be understood that the present invention may be implemented either by hardwired logic or by a microprocessor based system. Upon activation of the power supply, as indicated at block 84, latch 86 is set to allow the series switching circuit 16 to be conductive and the shunt switching circuit 18 to be open. Current monitoring is initiated at point 88 and proceeds to point 90 where the instantaneous overcurrent monitoring takes place by the maximum current sensor 22 explained above. In this embodiment, the predetermined number n of the counter is set equal to 4 although it should be understood that other predetermined numbers may be selected. Operation of the detection for a fault is indicated by the fault detection point 92. If no fault is present, processing proceeds to point 94 where the count of the counter is checked to see if it is zero. The processing continues to loop between points 92 and 94 if the count is zero until the maximum current sensor 22 produces a high level output signal indicating current flow above the maximum. At this point, processing proceeds to points 96 and 98 where the shunt switching circuit 18 is closed and series switching circuit 16 is opened. Processing proceeds to point 100 where the count of the augmented by 1. Processing proceeds to point 102 where a determination is made of whether or not X is equal to the predetermined number. If the answer is "yes", the program proceeds to point 86 where the latch is set to cause the shunt switching circuit 18 to be open circuited and the series switching circuit 16 to remain open circuited to disconnect the power supply 12 from the electrical load 14. An overcurrent trip indicator 104 is activated to indicate the fault condition. If the answer is "no" at decision point 102, processing proceeds to decision point 106 where a determination is made by the zero current detector 26 to determine if the current has reached a zero point. When the current reaches a zero point, processing proceeds to point 108 where the series switching circuit 16 is turned back on. When X is less than n, processing proceeds from point 94 to point 110 where a determination is made by the zero current detector 26 to detect the next zero current crossing. Processing proceeds to point 112 where the count of the counter 30 is decremented by the output from the timer 34 as passed by the NAND gate 38. Processing proceeds to point 114 where a determination is made if X is equal to zero. If the answer is "no", the program proceeds to point 92. If the answer is "yes", processing proceeds to point 116 where the shunt switching circuit 18 is turned off and the circuit returns to normal operation with current flowing only through the series switching circuit 16.

As indicated in FIG. 1, as an alternative to controlling the shunt switching circuit 18 with the second control signal, the shunt switching circuit may be controlled by the first control signal. Each time the series switching circuit 16 is connected back in series with the power supply 12 and electrical load 14 by changing the first control signal from the second level to the first level, the shunt switching circuit would be disconnected. The first level of the first control signal would disconnect the shunt switching circuit and the second level would connect the shunt circuit.

While the invention has been described in terms of its preferred embodiment, it should be understood that numerous modifications may be made thereto without departing from the spirit and scope of the present invention. It is intended that all such modifications fall within the scope of the appended claims.

We claim:

1. A protection system for a power supply for preventing the drawing of an excessive amount of current by an electrical load fault comprising:
    (a) means for sensing the magnitude of current flowing to the electrical load and producing a first control signal having a first level when current flow is less than a maximum amount of the power supply and having a second level when current flow exceeds the maximum amount; and a second control signal having a first level which occurs in response to detection of current flow greater than the maximum amount of current flow and a second level when a load fault is not present;
    (b) a switching means disposed in series with the load, conduction of the switching means being controlled by the first control signal and passing current when the first control signal is at the first level; and (c) a shunt circuit, coupled in parallel with the switching means, the shunt circuit containing a switching circuit coupled to an impedance which limits the amount of current drawn by the load when the impedance is in series with the load, conduction of the switching circuit being controlled by the second control signal and passing current to permit current flow through the impedance of the shunt circuit when the second control signal has the first level and blocking current flow when the second control signal has the second level.

2. A protection system in accordance with claim 1 wherein the means for sensing and producing includes:
means, coupled to the electrical load, for detecting when the flow of current between the power supply and the load is zero, the first level of the first control signal being produced in response to the detection of the flow of current between the power supply and the load being zero after the second level of the first signal has been produced.

3. A protection system in accordance with claim 1 wherein the means for sensing and producing comprises:
(a) counting means, responsive to each occurrence of the second level of the first signal, for counting the number of occurrences of the second level of the first signal and producing a trip signal when a predetermined count of the number of occurrences of the second level of the first signal is reached; and
(b) means responsive to the trip signal for disconnecting the power supply from the load.

4. A protection system in accordance with claim 2 wherein the means for sensing and producing comprises:
(a) counting means, responsive to each occurrence of the second level of the first signal, for counting the number of occurrences of the second level of the first signal and producing a trip signal when a predetermined count of the number of occurrences of the second level of the first signal is reached; and
(b) means responsive to the trip signal for disconnecting the power supply from the load.

5. A protection system in accordance with claim 3 further comprising:
timing means, responsive to the means for detecting when the flow of current is zero, for producing a count decrementing signal each time a predetermined time elapses between a last occurrence of a zero current flow and a detection of current flow greater than the maximum rated current flow, the count decrementing signal causing the count of the counting means to be decremented.

6. A protection system in accordance with claim 4 further comprising:
timing means, responsive to the means for detecting when the flow of current is zero for producing a count decrementing signal each time a predetermined time elapses between a last occurrence of a zero current flow and a detection of current flow greater than the maximum rated current flow the count decrementing signal causing the count of the counting means to be decremented.

7. A protection system in accordance with claim 5 wherein the predetermined time is equal to 90° of a cycle of the AC power supply.

8. A protection system in accordance with claim 6 wherein the predetermined time is equal to 90° of a cycle of the AC power supply.

9. A protection system in accordance with claim 3 wherein the predetermined count is four.

10. A protection system in accordance with claim 4 wherein the predetermined count is four.

11. A protection system in accordance with claim 4 wherein the means for sensing and producing includes:
(a) a first latch, responsive to the sensed current and the means for detecting when the current flow is zero, having a set state which is set by a sensed current flow greater than the maximum amount, the first latch producing the second level of the first signal in response to the sensing of current flow greater than the maximum amount and having a reset state which is reset in response to the sensed current being zero;
(b) a second latch, responsive to the sensed current flow and the counting means, having a set state which is set by a sensed current flow greater than the maximum amount, the second latch producing the first level of the second signal in response to the sensing of current flow greater than the maximum rated current flow and having a reset state which is reset in response to the counting means counting the predetermined count or to the counter counting to zero.

12. A protection system in accordance with claim 11 wherein the means for sensing and producing further comprises:
(a) timing means, responsive to the means for detecting when the flow of current is zero, for producing a count decrementing signal each time a predetermined time elapses between a last occurrence of a zero count flow and a detection of current flow greater than the maximum amount, the count decrementing signal causing the count of the counting means to be decremented;
(b) an AND gate having an input, from the means for detecting flow of zero current, signalling the flow of zero current and an input which is the second control signal and an output applied to the timing means;
(c) a NAND gate having an input from the timing means signalling the elapsing of the predetermined time, an input which is the first control signal and an input which is the second control signal and an output which is the decrement signal; and
(d) a NAND gate having an input from the first control signal and an input from the second control signal and an output which is the augment signal.

13. A protection circuit in accordance with claim 1 wherein said shunt circuit comprises:
(a) a first silicon controlled rectifier and a second silicon controlled rectifier in antiparallel with the first silicon controlled rectifier, the second control signal being applied to gates of the silicon controlled rectifiers; and
(b) the impedance being in series with the antiparallel combination of the silicon controlled rectifiers.

14. A protection circuit in accordance with claim 1 wherein the switching circuit comprises:
a first series circuit having a pair of switches which are conductive for positive or negative voltage swings of an AC signal flowing between a pair of terminals between which current flows when the first level of the first control signal is applied to a control terminal, one of the pair of terminals of the one of the switches being coupled to the power supply, one of the pair of terminals of the other of the switches being coupled to the load, the other of the terminals of the pair of switches being coupled to each other to form a series circuit between the first terminals of the pair of switches, a second series circuit comprised of a pair of oppositely poled diodes, one of the diodes having a cathode coupled to the power supply and an anode coupled to the other of the terminals of the switches which are coupled together, the other of the diodes having a cathode coupled to the load and an anode coupled to the other of the switches which are coupled together and to the anode of the other diode.

15. A protection circuit in accordance with claim 14 wherein the switching circuit further comprises:
a resistance coupled between the other of the pair of terminals of the switches, the magnitude of current flow being sensed by a voltage drop across the resistance.

16. A protection circuit in accordance with claim 1 wherein:
(a) the shunt circuit includes:
(i) a first silicon controlled rectifier and a second silicon controlled rectifier in antiparallel with the first silicon controlled rectifier, the second control signal being applied to gates of the silicon controlled rectifiers; and
(ii) the impedance being in series with the antiparallel combination of the silicon controlled rectifiers; and wherein
(b) the switching circuit includes a first series circuit having a pair of switches which are conductive for positive or negative voltage swings of an AC signal flowing between a pair of terminals between which current flows when the first level of the first control signal is applied to a control terminal, one of the pair of terminals of the one of the switches being coupled to the power supply, one of the pair of terminals of the other of the switches being coupled to the load, the other of the terminals of the pair of switches being coupled to each other to form a series circuit between the first terminals of the pair of switches, a second series circuit comprised of a pair of oppositely poled diodes, one of the diodes having a cathode coupled to the power supply and an anode coupled to the other of the terminals of the switches which are coupled together, the other of the diodes having a cathode coupled to the load and an anode coupled to the other of the switches which are coupled together and to the anode of the other diode.

17. A protection circuit in accordance with claim 16 wherein the switching circuit further comprises:
a resistance coupled between the other of the pair of terminals of the switches, the magnitude of current flow being sensed by a voltage drop across the resistance.

18. A protection system for a power supply for preventing the drawing of an excessive amount of current by an electrical load fault comprising:
(a) means for sensing the magnitude of current flowing to the electrical load and producing a first control signal having a first level when current flow is less than a maximum rated amount of the power supply and having a second level when current flow exceeds the maximum rated amount;
(b) a switching means disposed in series with the load, conduction of the switching means being controlled by the first control signal and passing current when the first control signal is at the first level; and
(c) a shunt circuit, coupled in parallel with the switching means, the shunt circuit containing a switching circuit coupled to an impedance which limits the amount of current drawn by the load when the impedance is in a path of current flow between the power supply and the load, conduction of the shunt circuit being controlled by the first control signal and passing current to permit current flow through the impedance of the shunt circuit when the first control signal has the second level and blocking current flow when the first control signal has the first level.

* * * * *